No. 808,122. PATENTED DEC. 26, 1905.
J. TANCK.
CANVAS TIGHTENER.
APPLICATION FILED AUG. 3, 1905.
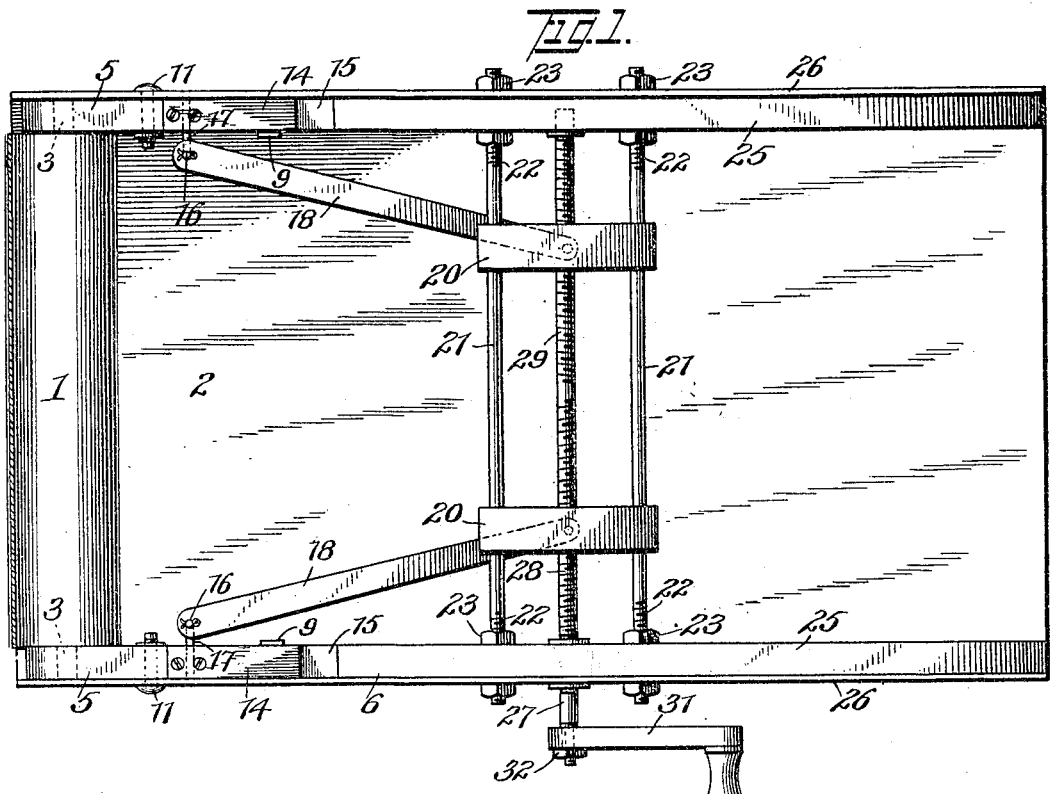
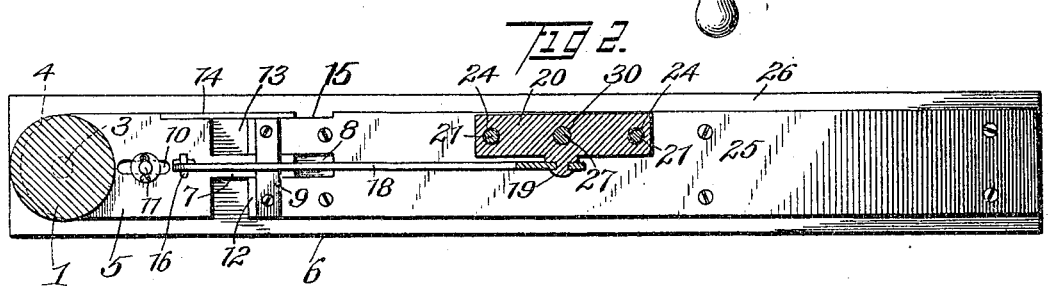
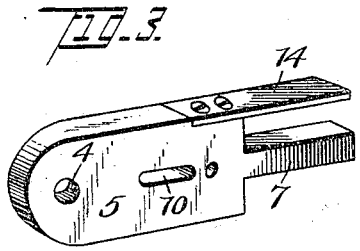
J. Tanck, Inventor
Witnesses
By
Attorney

UNITED STATES PATENT OFFICE.

JURGEN TANCK, OF PIPESTONE, MINNESOTA.

CANVAS-TIGHTENER.

No. 808,122.　　Specification of Letters Patent.　　Patented Dec. 26, 1905.

Application filed August 3, 1905. Serial No. 272,600.

*To all whom it may concern:*

Be it known that I, JURGEN TANCK, a citizen of the United States, residing at Pipestone, in the county of Pipestone and State of Minnesota, have invented a new and useful Canvas-Tightener for Harvesting and other Machines, of which the following is a specification.

The invention relates to a canvas-tightener for harvesting and other machines.

The object of the present invention is to improve the construction of canvas-tighteners for harvesting and other machines and to provide a simple and comparatively inexpensive device designed for use on various kinds of endless conveyers and capable of ready adjustment to regulate the tension on the canvas or other material of which the conveyer is constructed.

With these and other objects in view the invention consists in the construction and novel combination and arrangement of parts hereinafter fully described, illustrated in the accompanying drawings, and pointed out in the claims hereto appended.

In the drawings, Figure 1 is a plan view of a canvas-tightener constructed in accordance with this invention. Fig. 2 is a longitudinal sectional view. Fig. 3 is a detail perspective view of one of the slidable bearing-blocks.

Like numerals of reference designate corresponding parts in all the figures of the drawings.

1 designates one of the end rollers of an endless conveyer of a harvesting or other machine, and the said end roller, which is capable of adjustment to vary the tension on the canvas 2 or other material of which the endless conveyer may be constructed, has its journals 3 arranged in suitable bearings 4 of a pair of slidable bearing-blocks 5, located at one end of the frame 6 of the conveyer. The sides of the frame 6 may be constructed in any desired manner and are provided at one end with suitable recesses for the reception of the slidable bearing-blocks 5, and the latter are provided with longitudinal arms or shanks 7, extending centrally from the inner ends of the bearing-blocks and arranged in suitable guides 8 of the sides of the frame. The guides 8 preferably consist of slots or grooves, and suitable strips or pieces 9 are extended across the slots or grooves at the inner faces of the sides for retaining the shanks or arms 7 in the guides. The bearing-blocks are also provided with longitudinal slots 10, through which pass bolts or pins 11, which pierce the sides of the frame of the conveyer and which retain the bearing-blocks in proper position on the same. The bolts or pins are preferably secured in the slots of the bearing-blocks by means of a washer and key, as shown; but any other suitable means may be employed for this purpose, as will be readily understood.

The inner ends of the body portions of the bearing-blocks are spaced from the walls 12 of the recesses 13, and in order to protect the parts from dust and dirt guards or shields 14 are provided. The guards or shields consist of metallic strips secured at one end by screws or other suitable fastening devices to the upper faces of the slidable bearing-blocks, and they extend beyond the walls 12 of the recesses and prevent the canvas of the conveyer from dropping into the same. The guards or shields 14 have their upper faces flush with the upper edges of the bearing-blocks, being secured in suitable recesses thereof, as clearly shown in Fig. 3, and the sides of the frame of the conveyer are also provided with recesses 15 for the guards or shields 14.

The slidable bearing-blocks are provided at their inner faces with pivots 16, connected with the bearing-blocks by suitable shanks or arms 17 and arranged in openings of the outer ends of a pair of connecting-bars 18. The connecting-bars are secured to the pivots by means of suitable keys, as clearly shown in Fig. 1, and their inner ends are secured by suitable pivots 19 to a pair of transversely-movable cross-heads or slides 20. The connecting-bars diverge outwardly, and the cross-heads are adapted to be moved toward and from each other to force the connecting-bars outwardly and to draw them inwardly. By this adjustment the desired tension may be placed on the canvas 2.

The cross-heads are guided in their transverse movement by means of transversely-disposed guide-rods 21, extending across the frame and provided with threaded ends 22, which are secured to the sides of the frame by means of nuts 23, arranged in pairs and engaging the inner and outer faces of the sides. These guide-rods are passed through suitable openings 24 of the cross-heads or slides and brace the frame of the conveyer and increase the durability of the same. The sides may, as illustrated in the accompanying drawings, be composed of two longitudinal bars or pieces 25 and 26, secured together by suitable fastening devices; but any other desired construction may be employed. When the sides are composed of separate pieces, the nuts of the guide-rods will assist in clamping the same together.

The transversely-movable slides or cross-heads are operated by means of a transversely-disposed adjusting-screw 27, having right and left hand threaded portions 28 and 29, which engage correspondingly-threaded openings 30 of the cross-heads or slides. The openings 30 are located at the centers of the slides or cross-heads, and when the adjusting-screw 27 is rotated the cross-heads or slides will be simultaneously moved toward or from each other, according to the direction in which the screw is turned. The screw 27, which is journaled in suitable bearings of the sides of the frame, has one end extended beyond the same and provided with a suitable crank-handle 31, detachably secured to the extended end of the adjusting-screw by means of a nut 32 and adapted to be removed, if desired.

The tension device or tightener is adapted for use on various kinds of endless conveyers, and it is capable of moving one set of bearings inwardly and outwardly to place the desired tension on the canvas or other form of traveling apron.

Having thus fully described my invention, what I claim as new, and desire to secure by Letters Patent, is—

1. In a device of the class described, the combination of a pair of bearings mounted for inward and outward movement, transversely-movable slides or cross-heads, divergent connecting-bars extending from the slides or cross-heads, and means for actuating the slides or cross-heads to move the bearings inward and outward.

2. In a device of the class described, the combination of a pair of bearings mounted for inward and outward movement, transversely-movable slides or cross-heads, divergent connecting-bars extending from the slides or cross-heads, and an adjusting-screw having right and left hand threads for actuating the slides or cross-heads.

3. In a device of the class described, the combination with inwardly and outwardly movable bearings, of transversely-movable slides or cross-heads, divergent connecting-bars extending from the slides or cross-heads to the bearings, guides for the slides or cross-heads, and adjusting means for moving the slides or cross-heads simultaneously toward and from each other.

4. In a device of the class described, the combination of a frame provided with parallel guide-rods, slides or cross-heads movable on the guide-rods, bearings mounted for inward and outward movement, an adjusting-screw engaging the slides or cross-heads for actuating the same, and means for connecting the slides or cross-heads with the bearings.

5. In a device of the class described, the combination of a frame having opposite recesses forming guides, slidable bearing-blocks having arms slidable in the said guides, guards or shields extending across the space between the bearing-blocks and the frame and located above the said arms, and means for moving the bearing-blocks inwardly and outwardly.

6. In a device of the class described, the combination of a frame provided at opposite sides with recesses and having slots or grooves forming ways, slidable bearing-blocks located in the recesses and provided with arms fitted in the grooves, guards secured to the bearing-blocks and carried by the same, said guards extending from the inner ends of the bearing-blocks to points beyond the recesses, and means for moving the bearing-blocks inwardly and outwardly.

In testimony that I claim the foregoing as my own I have hereto affixed my signature in the presence of two witnesses.

JURGEN TANCK.

Witnesses:
CLINTON D. FIELDS,
A. W. BEEDE.